United States Patent
Yoshizawa et al.

(10) Patent No.: US 12,092,338 B2
(45) Date of Patent: Sep. 17, 2024

(54) ELECTRIC BICYCLE AND BUILT-IN KITCHEN UNIT

(71) Applicant: PANASONIC INTELLECTUAL PROPERTY MANAGEMENT CO., LTD., Osaka (JP)

(72) Inventors: Jin Yoshizawa, Osaka (JP); Kazuaki Hashimoto, Osaka (JP); Takashi Uchida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1061 days.

(21) Appl. No.: 16/967,982

(22) PCT Filed: Mar. 11, 2019

(86) PCT No.: PCT/JP2019/009599
§ 371 (c)(1),
(2) Date: Aug. 6, 2020

(87) PCT Pub. No.: WO2019/188169
PCT Pub. Date: Oct. 3, 2019

(65) Prior Publication Data
US 2021/0033285 A1 Feb. 4, 2021

(30) Foreign Application Priority Data
Mar. 29, 2018 (JP) .................. 2018-066055

(51) Int. Cl.
*F24C 15/30* (2006.01)
*B62J 43/13* (2020.01)
(Continued)

(52) U.S. Cl.
CPC ............... *F24C 15/30* (2013.01); *B62J 43/13* (2020.02); *B62J 45/20* (2020.02); *B62J 99/00* (2013.01); *B62M 6/45* (2013.01); *G06F 8/61* (2013.01)

(58) Field of Classification Search
None
See application file for complete search history.

(56) References Cited

U.S. PATENT DOCUMENTS 8,738,212 B1 * 5/2014 Schieffelin ............ H04W 4/027
180/205.1
2014/0309886 A1 * 10/2014 Ricci ...................... G06V 20/59
701/41
(Continued)

FOREIGN PATENT DOCUMENTS

JP 2014-012525 A 1/2014

OTHER PUBLICATIONS

Dow et al., "An Energy Management System for e-Bikes", 2017 8th IEEE Annual Information Technology, Electronics and Mobile Communication Conference (IEMCON), pp. 354-357 (Year: 2017).*
(Continued)

*Primary Examiner* — Tamara L Weber
(74) *Attorney, Agent, or Firm* — Rimon P.C.

(57) ABSTRACT

An electric bicycle includes: an electric motor; a storage unit in which control software for controlling the electric motor is stored; a control unit configured to run the control software stored in the storage unit; and a communication interface unit to which a piece of hardware is removably and communicably connected. The control unit is configured to run an other piece of software different from the control software to control the piece of hardware which is communicably connected to the communication interface unit. The other piece of software is installed in the storage unit. Each
(Continued)

of the control software and the other piece of software communicates using a distributed-communication protocol.

7 Claims, 6 Drawing Sheets

(51) Int. Cl.
    *B62J 45/20*         (2020.01)
    *B62J 99/00*         (2020.01)
    *B62M 6/45*          (2010.01)
    *G06F 8/61*          (2018.01)

(56) References Cited

U.S. PATENT DOCUMENTS

| | | | |
|---|---|---|---|
| 2016/0008985 A1* | 1/2016 | Kim | G06F 1/18 |
| | | | 901/1 |
| 2016/0016628 A1 | 1/2016 | Thompson | |
| 2016/0173530 A1* | 6/2016 | Miyake | H04L 63/20 |
| | | | 726/3 |
| 2016/0221627 A1* | 8/2016 | Hines | B62J 6/056 |
| 2019/0248439 A1* | 8/2019 | Wang | B62K 11/10 |

OTHER PUBLICATIONS

International Search Report and Written Opinion issued in International Patent Application No. PCT/JP2019/009599, mailed on May 21, 2019; with partial English translation.
Partial Supplementary European Search Report dated Mar. 30, 2021 issued corresponding European Patent Application No. 19776332.9.

* cited by examiner

ELECTRIC BICYCLE AND BUILT-IN KITCHEN UNIT

CROSS-REFERENCE OF RELATED APPLICATIONS

This application is the U.S. National Phase under 35 U.S.C. § 371 of International Patent Application No. PCT/JP2019/009599, filed on Mar. 11, 2019, which in turn claims the benefit of Japanese Application No. 2018-066055, filed on Mar. 29, 2018, the entire disclosures of which Applications are incorporated by reference herein.

TECHNICAL FIELD

The present invention relates to an electric bicycle and a built-in kitchen unit.

BACKGROUND ART

Conventionally, electric bicycles that offer easy riding by adding auxiliary driving force generated by an electric motor to man-powered driving force, such as pedal force applied to pedals, have been known. Patent Literature (PTL) 1 discloses an electric bicycle which includes a speed sensor.

CITATION LIST

Patent Literature

PTL 1: Japanese Unexamined Patent Application Publication No. 2014-012525

SUMMARY OF THE INVENTION

Technical Problem

The present invention provides an electric bicycle to which a function is readily added and whose function is readily extended, and a built-in kitchen unit to which a function is readily added and whose function is readily extended.

Solutions to Problem

An electric bicycle according to an aspect of the present invention includes: an electric motor; a storage unit in which control software for controlling the electric motor is stored; a control unit configured to run the control software stored in the storage unit; and a communication interface unit to which a piece of hardware is removably and communicably connected. The control unit is configured to run an other piece of software different from the control software to control the piece of hardware which is communicably connected to the communication interface unit, the other piece of software being installed in the storage unit. Each of the control software and the other piece of software communicates using a distributed-communication protocol.

A built-in kitchen unit according to an aspect of the present invention includes: a heater for cooking; a storage unit in which control software for controlling the heater is stored; a control unit configured to run the control software stored in the storage unit; and a communication interface unit to which a piece of hardware is removably and communicably connected. The control unit is configured to run an other piece of software different from the control software to control the piece of hardware which is communicably connected to the communication interface unit, the other piece of software being installed in the storage unit. Each of the control software and the other piece of software communicates using a distributed-communication protocol.

Advantageous Effect of Invention

According to the present invention, an electric bicycle to which a function is readily added and whose function is readily extended, and a built-in kitchen unit to which a function is readily added and whose function is readily extended can be realized.

DESCRIPTION OF EXEMPLARY EMBODIMENTS

Hereinafter, embodiments will be described with reference to the drawings. Note that the embodiments below each describe a general or specific example. The numerical values, shapes, materials, elements, the arrangement and connection of the elements, steps, and the processing order of the steps, etc. presented in the embodiments below are mere examples and do not limit the present invention. Furthermore, among the structural elements in the embodiments below, those not recited in any one of the independent claims representing the most generic concepts will be described as optional structural elements.

Note that the drawings are schematic diagrams, and do not necessarily provide strictly accurate illustration. Furthermore, throughout the drawings, the same reference signs are given to essentially the same structural elements, and redundant descriptions may be omitted or simplified.

Embodiment 1

[Configuration of Electric Bicycle]

Figure 1:
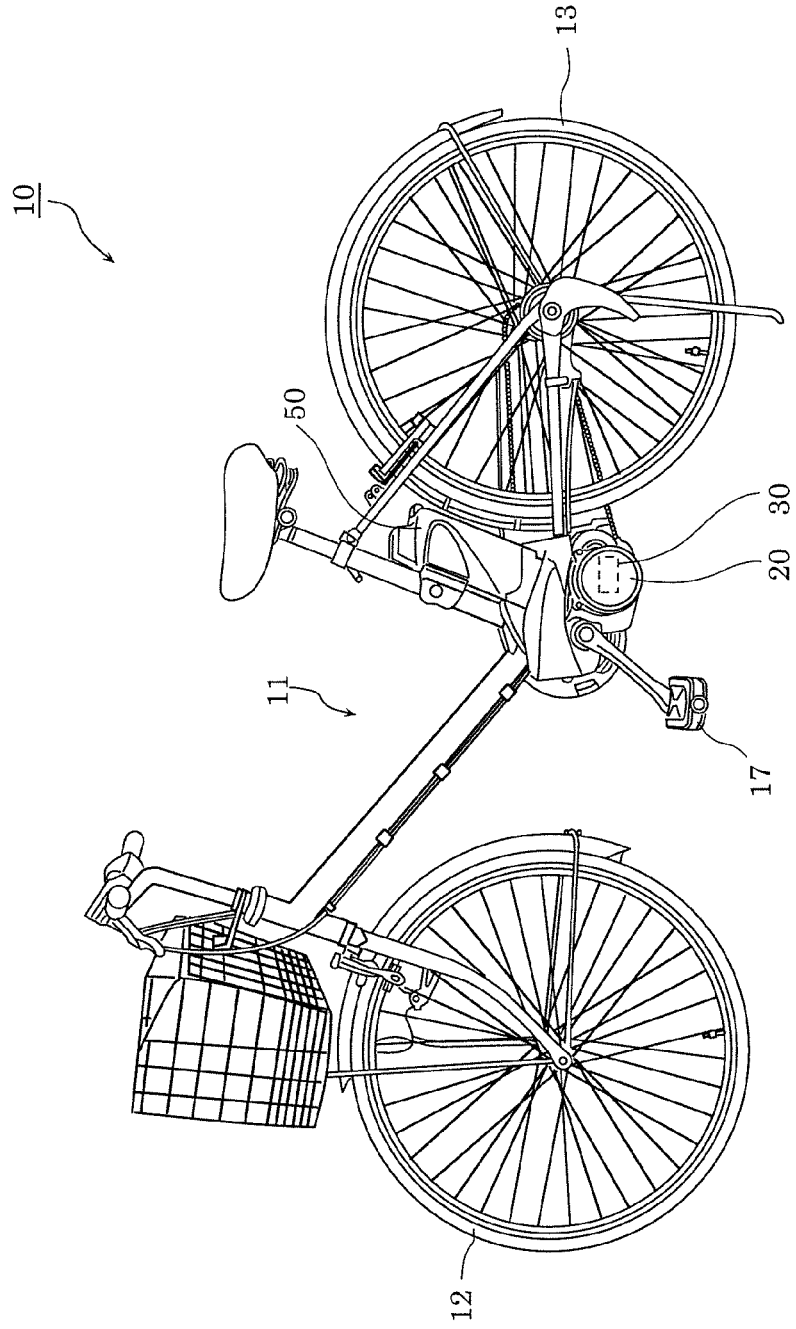
FIG. 1 is a diagram illustrating an external appearance of an electric bicycle according to Embodiment 1.
Figure 2:
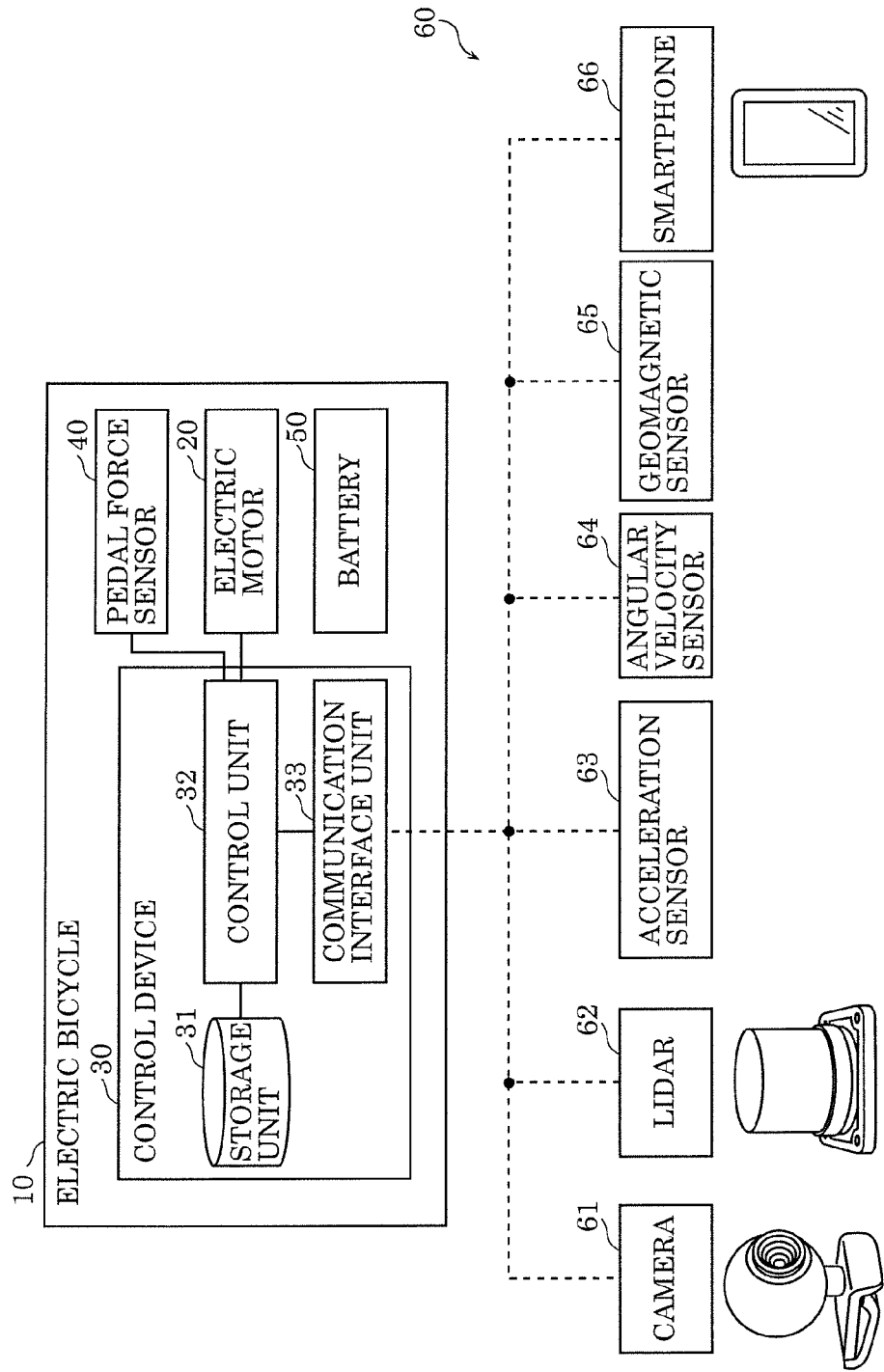
FIG. 2 is a block diagram illustrating a function configuration of the electric bicycle according to Embodiment 1.

First, the configuration of an electric bicycle according to Embodiment 1 will be described. FIG. 1 is a diagram illustrating an external appearance of an electric bicycle according to Embodiment 1. FIG. 2 is a block diagram illustrating a function configuration of the electric bicycle according to Embodiment 1.

As illustrated in FIG. 1 and FIG. 2, electric bicycle 10 includes body 11, front wheel 12, rear wheel 13, pedals 17, electric motor 20 attached to body 11, control device 30 which controls electric motor 20, pedal force sensor 40, and battery 50.

Electric bicycle 10 is the so-called electrically assisted bicycle. Electric motor 20 included in electric bicycle 10 can assist body 11 in traveling forward based on pedal force applied to pedals 17. Electric motor 20 is driven, based on the control of control device 30, using electric power supplied from battery 50. Storage unit 31 in control device 30 stores a piece of software that is stored in advance for controlling electric motor 20.

In addition, electric bicycle 10 lends itself to hacking, or is hackable. The term hackable means that pieces of hardware and pieces of software are capable of being freely added and deleted. For example, pieces of hardware 60, such as camera 61, laser imaging detection and ranging (LIDAR) 62, acceleration sensor 63, angular velocity sensor 64, geomagnetic sensor 65, and smartphone 66, are removably and communicably connected to communication interface unit 33 included in electric bicycle 10. In addition, it is possible to install, in storage unit 31 in control device 30, a piece of software for controlling such pieces of hardware 60.

[Configuration of Control Device]

Hereinafter, the function configuration of control device 30 included in electric bicycle 10 will be described in detail with continuous reference to FIG. 2. As illustrated in FIG. 2, control device 30 includes storage unit 31, control unit 32, and communication interface unit 33.

Figure 3:
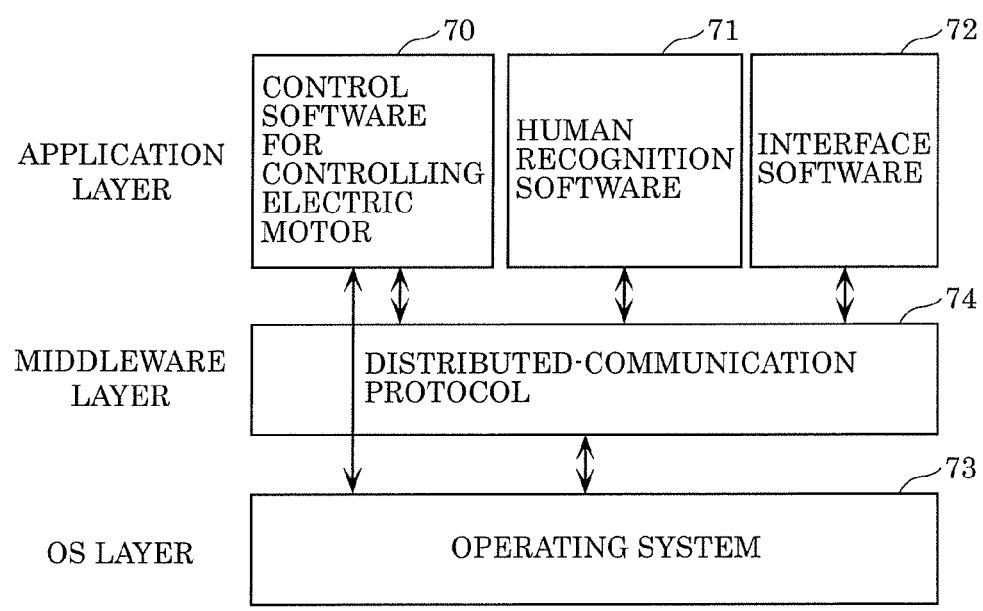
FIG. 3 is a diagram illustrating a hierarchical structure of pieces of software which are stored in a storage unit in Embodiment 1.

Storage unit 31 stores, in advance, control software 70 for controlling electric motor 20. FIG. 3 is a diagram illustrating a hierarchical structure of pieces of software which are stored in storage unit 31. In addition, another piece of software different from control software 70 can be subsequently installed in storage unit 31. In the example shown in FIG. 3, human recognition software 71 for performing human recognition using camera 61, and interface software 72 for controlling electric motor 20 based on a result obtained from the human recognition are installed. Specifically, storage unit 31 is realized by a semiconductor memory, etc. Note that a piece of software is installed via, for example, communication interface unit 33, but may be installed using other methods.

Control unit 32 assists body 11 in traveling forward by running control software 70 stored in storage unit 31. Control unit 32 is realized by, for example, a processor, but may be realized by a microcomputer. In addition, control unit 32 may be realized by a field-programmable gate array (FPGA).

Specifically, control unit 32 determines, based on the pedal force applied to pedals 17 and the speed of electric bicycle 10, the amount of assist force (i.e. auxiliary driving force) which electric motor 20 generates. The pedal force applied to pedals 17 is obtained from pedal force sensor 40. Pedal force sensor 40 is, for example, a magnetostrictive torque sensor. The speed of electric bicycle 10 is calculated based on the number of rotations of rear wheel 13 (or front wheel 12) per unit time, and the size of rear wheel 13 (or front wheel 12). Note that although the speed of electric bicycle 10 is measured by, for example, a sensor, such as a Hall integrated circuit (IC), which is attached to rear wheel 13 (or front wheel 12), the method for detecting the speed of electric bicycle 10 is not particularly limited to the above.

A piece of hardware 60 is removably and communicably connected to communication interface unit 33. The state of being communicably connected to communication interface unit 33 indicates, for example, a state in which an electrical signal can be transmitted/received between control device 30 and the piece of hardware 60. Communication interface unit 33 is, for example, a wireless communication circuit, and is wirelessly and communicably connected with the piece of hardware 60, such as camera 61, by pairing. Communication interface unit 33 may be a wired communication circuit, and may be communicably connected with the piece of hardware in a wired manner. In this case, electric bicycle 10 (e.g. control device 30) includes a connector structure to which a cable for connecting the piece of hardware 60 and the wired communication circuit is inserted.

[Hierarchical Structure of Software]

Next, a hierarchical structure of pieces of software stored in storage unit 31 will be described in detail with continuous reference to FIG. 3.

Storage unit 31 stores operating system 73. Operating system 73 is a piece of software which performs basic control in control device 30, and provides a standard interface for pieces of software, such as control software 70, human recognition software 71, and interface software 72, which belong to an application layer. Operating system 73 is, for example, Linux (registered trademark), but is not particularly limited to the above.

In addition, storage unit 31 stores distributed-communication protocol 74. Distributed-communication protocol 74 is a communication protocol included in, for example, a robot operating system (ROS), but may be other distributed-communication protocols.

In the communication protocol included in the ROS, a piece of software which belongs to the application layer is treated as a node. In FIG. 3, control software 70 for controlling electric motor 20, human recognition software 71, and interface software 72 each correspond to a node.

In the communication protocol included in the ROS, the nodes are connected to one another via a data bus (i.e. a transmission line). A sending node outputs information to the data bus, and a receiving node picks up the information from the data bus only when the information is necessary for the receiving node itself. Even when a node is disconnected, such a communication protocol has a less impact on the other nodes. Accordingly, communication can be maintained among the other nodes without being disrupted. In addition, the other nodes can maintain communication without being disrupted even when a node is added. That is to say, in control device 30 included in electric bicycle 10, distributed-communication protocol 74 allows a piece of software which belongs to the application layer to be freely added and deleted. Distributed-communication protocol 74 is also used for communication between operating system 73 and the nodes.

Note that operating system 73 is not essential in FIG. 3. In control device 30 included in electric bicycle 10, communication is to be performed among the pieces of software in the application layer using distributed-communication protocol 74.

In addition, control software 70 is essential for electric bicycle 10 to realize an assist function for electric bicycle 10, and thus is not to be deleted nor changed by a general user. Because of this, control software 70 is black box software. The black box software is a piece of software which cannot be accessed by the general user. Control software 70 is stored in, for example, a logically different area from the other pieces of software in storage unit 31 so as to function as black box software. Control software 70 may be stored in a storage unit in another piece of hardware which is different from storage unit 31 so as to function as black box software. In addition, control software 70 may be protected using encryption, etc.

[Usage Example]

Hereinafter, an example of usage of electric bicycle 10 will be described. The following describes an example of electric bicycle 10 to which camera 61 is added, but a case in which another piece of hardware 60 is added will be the same as the case in which camera 61 is added.

For example, a general user purchases camera 61 in addition to electric bicycle 10, and communicably connects camera 61 to communication interface unit 33 included in electric bicycle 10. In addition, the general user obtains human recognition software 71 among pieces of open source software, and installs human recognition software 71 in storage unit 31. Consequently, control unit 32 included in electric bicycle 10 controls camera 61 which is communicably connected to communication interface unit 33 by running human recognition software 71 installed in storage unit 31 to perform human recognition processing.

As such, the general user can freely add a function to electric bicycle 10 in a do it yourself (DIY) manner.

In addition, a developer of electric bicycle 10 develops interface software 72 for controlling electric motor 20 using human recognition processing performed based on human recognition software 71. The developer develops interface software 72 which limits the assist force when an image captured by camera 61 includes at least a predetermined number of people (i.e. when it is crowded with people around electric bicycle 10). The developer communicably connect camera 61 to communication interface unit 33 included in electric bicycle 10. In addition, the developer installs human recognition software 71 and interface software 72 in storage unit 31. Consequently, control unit 32 can cause electric motor 20 and camera 61 which is communicably connected to communication interface unit 33 to interface with each other by running control software 70, human recognition software 71, and interface software 72. At this time, control software 70, human recognition software 71, and interface software 72 transmit/receive information (i.e. a digital value) with one another in accordance with distributed-communication protocol 74. Note that when electric motor 20 and another piece of hardware are caused to interface with each other, at least two pieces of software are to be used. The at least two pieces of software are control software 70 and interface software 72.

In this way, the developer can readily take measures, such as making a modification to interface software 72, while checking the actual operation of electric bicycle 10. That is to say, electric bicycle 10 that is hackable allows the developer to readily concretize an idea of the developer. Therefore, it is possible to realize the shortening of a period of time it takes for the development of the electric bicycle.

[Variation]

Note that a piece of hardware 60 which is communicably connected to communication interface unit 33 operates using, for example, an electric cell included in the piece of hardware 60 as a power source, but may operate using electric power supplied from battery 50 which supplies electric power to electric motor 20. Battery 50 is, for example, a secondary battery (i.e. a storage battery), such as a lithium ion battery.

When the piece of hardware 60 and communication interface unit 33 are connected with each other via a cable, the piece of hardware 60 can receive electric power supplied from battery 50 if an electric power supply terminal is included among a plurality of terminals which the connector structure has, and if the cable includes an electric power supply line.

In addition, when the piece of hardware 60 and communication interface unit 33 are wirelessly connected with each other, electric power is supplied in a noncontact manner. The method of supplying electric power in a noncontact manner is a radio-wave method, an electromagnetic field resonance method, or an electromagnetic induction method. When electric power is supplied in a noncontact manner using the radio-wave method, the piece of hardware 60 is provided with an antenna element for receiving electric power, and control device 30 is provided with an antenna element for supplying electric power. When electric power is supplied in a noncontact manner using the electromagnetic field resonance method or the electromagnetic induction method, the piece of hardware 60 is provided with a coil element for receiving electric power, and control device 30 is provided with a coil element for supplying electric power.

[Advantageous Effect, Etc.]

As has been described above, electric bicycle 10 includes: electric motor 20; storage unit 31 in which control software 70 for controlling electric motor 20 is stored; control unit 32 which runs control software 70 stored in storage unit 31; and communication interface unit 33 to which a piece of hardware 60 is removably and communicably connected. Control unit 32 runs another piece of software different from control software 70 to control the piece of hardware 60 which is communicably connected to communication interface unit 33. The other piece of software is installed in storage unit 31. Each of control software 70 and the other piece of software communicates using distributed-communication protocol 74.

With this, it is possible to realize electric bicycle 10 to which a function is readily added and whose function is readily extended.

In addition, for example, storage unit 31 stores operating system 73. Control software 70 and the other piece of software belong to an application layer.

With this, control unit 32 can control electric motor 20 and the piece of hardware 60 by running operating system 73.

In addition, for example, storage unit 31 stores an ROS which includes distributed-communication protocol 74. The ROS belongs to a middleware layer.

With this, control unit 32 can realize electric bicycle 10 to which a function is readily added and whose function is readily extended in accordance with the communication protocol of the ROS.

In addition, for example, control unit 32 runs control software 70 and the other piece of software (e.g. interface software 72) to cause electric motor 20 and the piece of hardware 60 to interface with each other. The piece of hardware 60 is communicably connected to communication interface unit 33.

With this, control unit 32 can extend a function of electric motor 20 by causing electric motor 20 and the piece of hardware 60 to interface with each other.

In addition, for example, control software 70 is black box software.

With this, it is possible to prevent control software 70 from being modified or deleted.

In addition, for example, electric bicycle 10 further includes battery 50 which supplies electric power to electric motor 20. The piece of hardware 60 which is communicably connected to communication interface unit 33 operates using the electric power supplied from battery 50.

Such electric bicycle 10 can supply electric power to the piece of hardware 60 using battery 50 which supplies electric power to electric motor 20.

Embodiment 2

[Configuration of Built-in Kitchen Unit]

Figure 4:
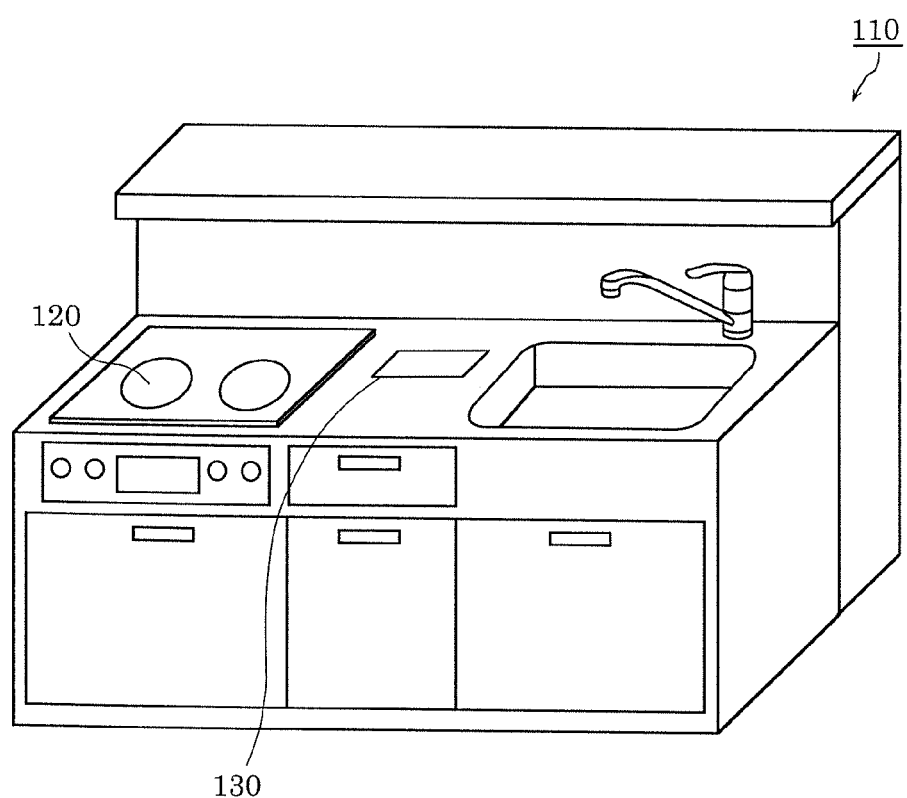
FIG. 4 is a diagram illustrating an external appearance of a built-in kitchen unit according to Embodiment 2.
Figure 5:
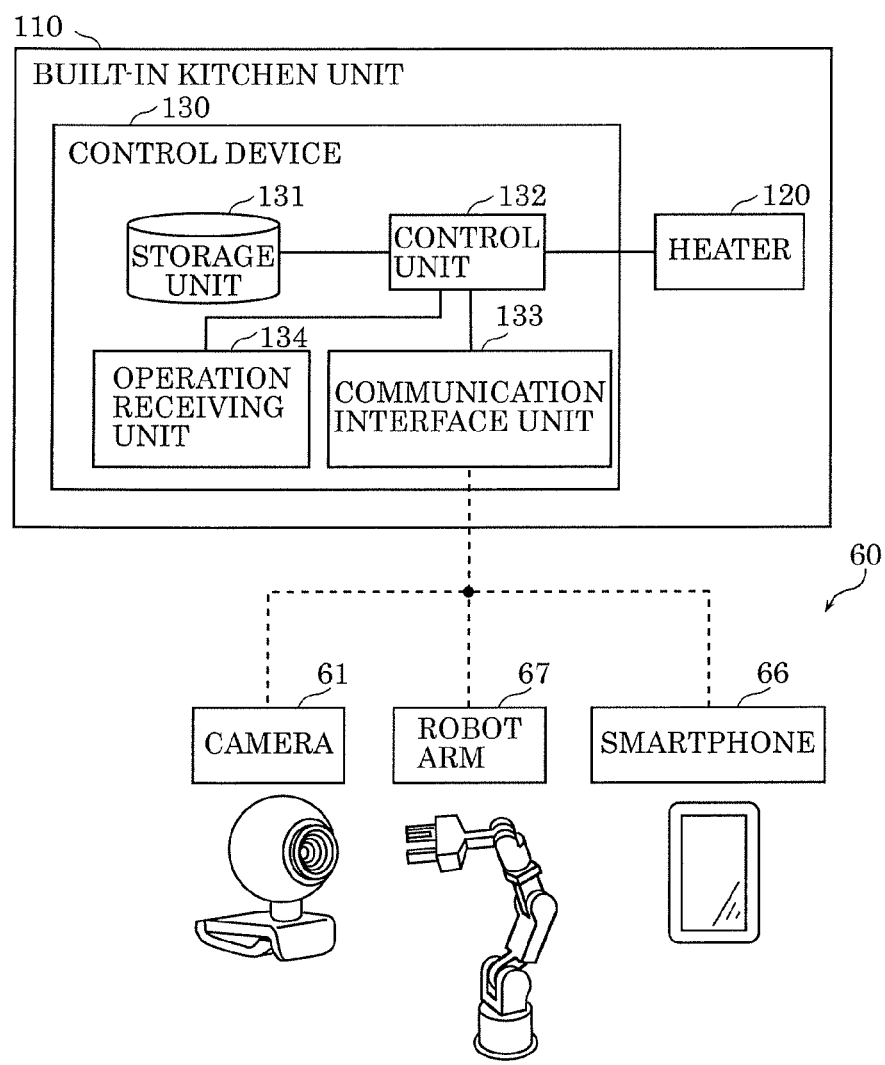
FIG. 5 is a block diagram illustrating a function configuration of the built-in kitchen unit according to Embodiment 2.

Devices subject to be hackable is not limited to electric bicycle 10. For example, a built-in kitchen unit may be hackable. Hereinafter, the configuration of a built-in kitchen unit according to Embodiment 2 will be described. FIG. 4 is a diagram schematically illustrating a built-in kitchen unit according to Embodiment 2. FIG. 5 is a block diagram illustrating a function configuration of the built-in kitchen unit according to Embodiment 2. Note that Embodiment 2 mainly describes differences from Embodiment 1. Therefore, descriptions of items that have been previously provided will be omitted or simplified in the following Embodiment 2.

As illustrated in FIG. 4 and FIG. 5, built-in kitchen unit 110 includes heater 120 for cooking, and control device 130 for controlling heater 120.

Built-in kitchen unit 110 is a unit used for cooking. Heater 120 is the so-called induction heating (IH) cooking heater, and heats a metal container in which an ingredient to be cooked is contained. Heater 120 is, in other words, an electromagnetic cooker. Control device 130 controls heater 120 based on a user operation. Control device 130 includes storage unit 131 in which a piece of software for controlling heater 120 is stored in advance.

Built-in kitchen unit 110 lends itself to hacking, or is hackable. For example, built-in kitchen unit 110 includes communication interface unit 133 to which pieces of hardware 60, such as camera 61, robot arm 67, and smartphone 66, are removably and communicably connected. In addition, it is possible to install, in storage unit 131 in control device 130, a piece of software for controlling such pieces of hardware 60.

[Configuration of Control Device]

Hereinafter, the function configuration of control device 130 included in built-in kitchen unit 110 will be described in detail with continuous reference to FIG. 5. As illustrated in FIG. 5, control device 130 includes storage unit 131, control unit 132, communication interface unit 133, and operation receiving unit 134.

Figure 6:
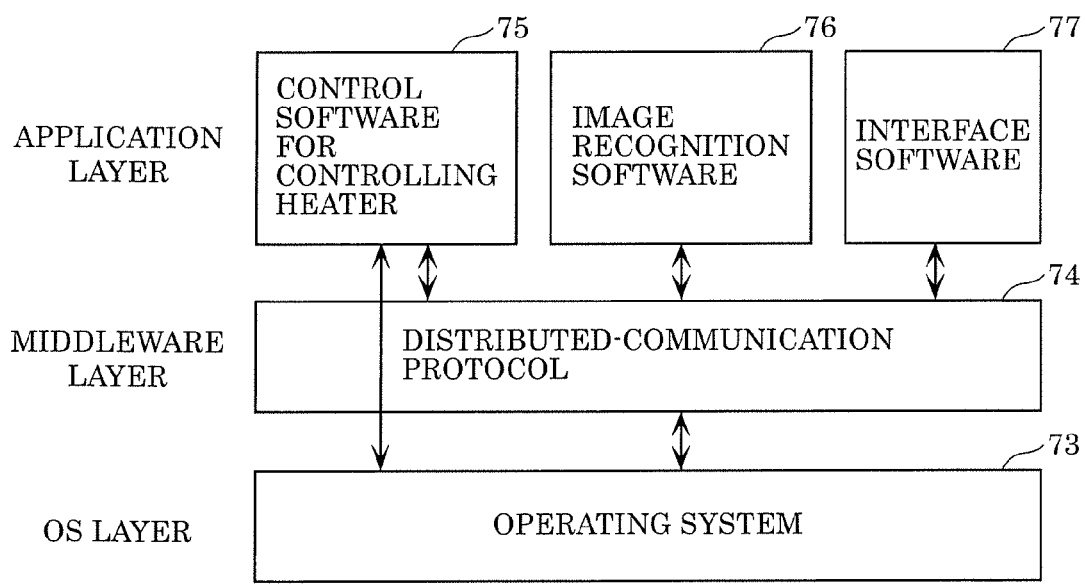
FIG. 6 is a diagram illustrating a hierarchical structure of pieces of software which are stored in a storage unit in Embodiment 2.

Storage unit 131 stores, in advance, control software 75 for controlling heater 120. FIG. 6 is a diagram illustrating a hierarchical structure of pieces of software which are stored in storage unit 131. In addition, another piece of software different from control software 75 can be subsequently installed in storage unit 131. FIG. 6 exemplifies image recognition software 76 for performing image recognition using camera 61, interface software 77 for controlling heater 120 based on a result obtained from the image recognition. Specifically, storage unit 131 is realized by a semiconductor memory, etc.

Control unit 132 runs, based on a user operation received by operation receiving unit 134, control software 75 stored in storage unit 131 to control heater 120. Control unit 132 is realized by, for example, a processor, but may be realized by a microcomputer. In addition, control unit 132 may be realized by a FPGA.

A piece of hardware 60 is removably and communicably connected to communication interface unit 133. Communication interface unit 133 is, for example, a wireless communication circuit, and is wirelessly and communicably connected with the piece of hardware 60, such as camera 61, by pairing. Communication interface unit 133 may be a wired communication circuit, and may be communicably connected with the piece of hardware in a wired manner. In this case, built-in kitchen unit 110 (e.g. control device 130) includes a connector structure to which a cable for connecting the piece of hardware 60 and the wired communication circuit is inserted.

Operation receiving unit 134 is a user interface operated by a user for cooking using heater 120. Operation receiving unit 134 is realized by a touch panel or a hardware key (hardware button).

[Hierarchical Structure of Software]

Next, the hierarchical structure of pieces of software which are stored in storage unit 131 will be described in detail with continuous reference to FIG. 6.

Storage unit 131 stores operating system 73. In addition, storage unit 131 stores distributed-communication protocol 74. Distributed-communication protocol 74 is a communication protocol included in, for example, a robot operating system (ROS), but may be other distributed-communication protocols. In control device 130 included in built-in kitchen unit 110, distributed-communication protocol 74 allows a piece of software which belongs to an application layer to be freely added and deleted.

Note that operating system 73 is not essential in FIG. 6. In control device 130 included in built-in kitchen unit 110, communication is to be performed among pieces of software in the application layer using distributed-communication protocol 74.

In addition, control software 75 is essential for built-in kitchen unit 110 to realize a function of controlling heater 120 included in built-in kitchen unit 110, and thus is not to be deleted nor changed by a general user. Because of this, control software 75 is black box software.

[Usage Example]

Hereinafter, an example of usage of built-in kitchen unit 110 will be described. The following describes an example of built-in kitchen unit 110 to which camera 61 is added, but a case in which another piece of hardware 60 is added will be the same as the case in which camera 61 is added.

For example, a general user purchases camera 61 in addition to built-in kitchen unit 110, and communicably connects camera 61 to communication interface unit 133 included in built-in kitchen unit 110. In addition, the general user obtains image recognition software 76 among pieces of open source software, and installs image recognition software 76 in storage unit 131. Consequently, control unit 132 included in built-in kitchen unit 110 controls camera 61 which is communicably connected to communication interface unit 133 by running image recognition software 76 installed in storage unit 131 to perform image recognition processing.

As such, the general user can freely add a function to built-in kitchen unit 110 in a do it yourself (DIY) manner.

In addition, a developer of built-in kitchen unit 110 develops interface software 77 for controlling heater 120 using image recognition processing performed based on image recognition software 76. The developer develops interface software 77 which lowers the temperature of heater 120 when image recognition performed using an image captured by camera 61 determines that food which is being cooked on heater 120 is about to boil over. The developer communicably connects camera 61 to communication interface unit 133 included in built-in kitchen unit 110, and installs image recognition software 76 and interface software 77 in storage unit 131. Consequently, control unit 132 can cause heater 120 and camera 61 which is communicably connected to communication interface unit 133 to interface with each other by running control software 75, image recognition software 76, and interface software 77. At this time, control software 75, image recognition software 76, and interface software 77 transmit/receive information (i.e. a digital value) with one another in accordance with distributed-communication protocol 74. Note that when heater 120 and another piece of hardware are caused to interface with each other, at least two pieces of software are to be used. The at least two pieces of software are control software 75 and interface software 77.

In this way, the developer can readily take measures, such as making a modification to interface software 77, while checking the actual operation of built-in kitchen unit 110. Built-in kitchen unit 110 that is hackable allows the developer to readily concretize an idea of the developer. Therefore, it is possible to realize the shortening of a period of time it takes for the development of the built-in kitchen unit.

[Variation]

Note that a piece of hardware 60 which is communicably connected to communication interface unit 133 operates using, for example, an electric cell included in the piece of hardware 60 as a power source, but may operate using electric power supplied from built-in kitchen unit 110. Electric power may be supplied in a wired manner or in a noncontact manner.

[Advantageous Effect, Etc.]

As has been described above, built-in kitchen unit 110 includes: heater 120 for cooking; storage unit 131 in which control software 75 for controlling heater 120 is stored; control unit 132 which runs control software 75 stored in storage unit 131; and communication interface unit 133 to which a piece of hardware 60 is removably and communicably connected. Control unit 132 runs another piece of software different from control software 75 to control the piece of hardware 60 which is communicably connected to communication interface unit 133. The other piece of software is installed in storage unit 131. Each of control software 75 and the other piece of software communicates using distributed-communication protocol 74.

With this, it is possible to realize built-in kitchen unit 110 to which a function is readily added and whose function is readily extended.

Other Embodiment

Although embodiments have been described above, the present invention is not limited to the embodiments.

For example, the aforementioned embodiments have described an electric bicycle and a built-in kitchen unit which are hackable; however, the present invention may be realized as other devices or systems which are hackable. For example, the present invention may be realized as a toilet system that is hackable.

Note that general or specific aspects of the present invention may be realized by a system, a device, a method, an integrated circuit, a computer program, or a computer-readable recording medium such as a CD-ROM. The general or the specific aspects of the present invention may also be realized by any combination of a system, a device, a method, an integrated circuit, a computer program, and a recording medium. For example, the present invention may be realized as a method for controlling an electric bicycle or a built-in kitchen unit.

The present invention also encompasses: embodiments achieved by applying various modifications conceivable to those skilled in the art to each embodiment; and embodiments achieved by optionally combining the structural elements and the functions of each embodiment without departing from the essence of the present invention.

REFERENCE MARKS IN THE DRAWINGS 10 electric bicycle
20 electric motor
30, 130 control device
31, 131 storage unit
32, 132 control unit
33, 133 communication interface unit
60 hardware
70, 75 control software
72, 77 interface software (another software)
74 distributed-communication protocol
110 built-in kitchen unit
120 heater

The invention claimed is:

1. An electric bicycle, comprising:
an electric motor;
a storage unit in which control software for controlling the electric motor is stored;
a control unit configured to run the control software stored in the storage unit; and
a communication interface unit to which a piece of hardware is removably and communicably connected,
wherein:
the control unit is configured to run an other piece of software different from the control software to control the piece of hardware which is communicably connected to the communication interface unit, the other piece of software being installed in the storage unit,
each of the control software and the other piece of software communicates using a distributed-communication protocol,
each of the control software and the other piece of software is treated as a node in the distributed-communication protocol,
the piece of hardware includes a camera,
human recognition software and interface software is installed in the storage unit, and
the interface software is adapted such that an assist force generated by the electric motor is limited when an image captured by the camera includes at least a predetermined number of people.

2. The electric bicycle according to claim 1, wherein the storage unit stores an operating system, and the control software and the other piece of software belong to an application layer.

3. The electric bicycle according to claim 1, wherein the storage unit stores a robot operating system (ROS) which includes the distributed-communication protocol, and the ROS belongs to a middleware layer.

4. The electric bicycle according to claim 1, wherein the control unit runs the control software and the other piece of software to cause the electric motor and the piece of hardware to interface with each other, the piece of hardware being communicably connected to the communication interface unit.

5. The electric bicycle according to claim 1, wherein the control software is black box software.

6. The electric bicycle according to claim 1, further comprising:
a battery which supplies electric power to the electric motor, wherein the piece of hardware which is communicably connected to the communication interface unit operates using the electric power supplied from the battery.

7. The electric bicycle according to claim 1, wherein information is mutually transmitted and received between the nodes according to the distributed-communication protocol.

\* \* \* \* \*